United States Patent
Kawakami et al.

(10) Patent No.: US 12,215,971 B2
(45) Date of Patent: Feb. 4, 2025

(54) SHAPE CORRECTION DEVICE AND SHAPE CORRECTION METHOD BASED ON AMOUNT OF DEFORMATION MEASURED BY POINT MEASUREMENT SENSOR AND SURFACE MEASUREMENT SENSOR

(71) Applicant: HITACHI ASTEMO, LTD., Hitachinaka (JP)

(72) Inventors: Tatsuhiko Kawakami, Tokyo (JP); Noriyuki Sadaoka, Tokyo (JP); Chiharu Tachikawame, Hitachinaka (JP); Shuichi Tanaka, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 323 days.

(21) Appl. No.: 17/778,331

(22) PCT Filed: Nov. 20, 2020

(86) PCT No.: PCT/JP2020/043332
§ 371 (c)(1),
(2) Date: May 19, 2022

(87) PCT Pub. No.: WO2021/106767
PCT Pub. Date: Jun. 3, 2021

(65) Prior Publication Data
US 2022/0390222 A1 Dec. 8, 2022

(30) Foreign Application Priority Data
Nov. 29, 2019 (JP) .................................. 2019-216161

(51) Int. Cl.
*G01B 5/30* (2006.01)
*G01B 11/16* (2006.01)

(52) U.S. Cl.
CPC ................ *G01B 5/30* (2013.01); *G01B 11/16* (2013.01)

(58) Field of Classification Search
CPC ... G01N 2021/8809; G01N 2021/8864; G01N 2021/8861; G01N 2021/9518;
(Continued)

(56) References Cited

U.S. PATENT DOCUMENTS 5,046,852 A * 9/1991 Hametner .............. B21D 5/004
382/152
5,266,811 A 11/1993 Matsuura
(Continued)

FOREIGN PATENT DOCUMENTS

JP H04-176543 A 6/1992
JP 2000-065560 A 3/2000
(Continued)

OTHER PUBLICATIONS

International Search Report with English translation and Written Opinion issued in corresponding application No. PCT/JP2020/043332 dated Mar. 9, 2021.

*Primary Examiner* — Tran M. Tran
(74) *Attorney, Agent, or Firm* — Foley & Lardner LLP

(57) ABSTRACT

Provided are a surface inspection device that evaluates a shape of a molded product with high accuracy in a shorter time than in the related art, a shape correction device, a surface inspection method, and a shape correction method. A point measurement sensor 201 that measures each of positions of predetermined points 102 set on a surface of an inspection target 101; a surface measurement sensor 202 that measures a shape of a predetermined surface 103 including the plurality of predetermined points 102 by simultaneously measuring positions of a plurality of points of the inspection target 101; and a deformation amount computation unit 3 that obtains an amount of deformation of the inspection (Continued)

target 101 from a reference shape based on the positions of the predetermined points 102 measured by the point measurement sensor 201 and a normal direction of the predetermined surface 103 measured by the surface measurement sensor 202 are included.

14 Claims, 12 Drawing Sheets

(58) Field of Classification Search
CPC ..... G01N 2021/888; G01N 2021/8874; G01N 21/95607; G01B 21/20; G01B 21/30; G01B 21/32; G01B 11/245; G01B 7/34; G01B 7/345
See application file for complete search history.

(56) References Cited

U.S. PATENT DOCUMENTS

| | | | |
|---|---|---|---|
| 6,711,530 B1 | 3/2004 | Kase | |
| 7,414,732 B2* | 8/2008 | Maidhof | G01B 11/005 |
| | | | 250/559.22 |
| 7,640,137 B2* | 12/2009 | Numata | G06T 17/10 |
| | | | 702/155 |
| 8,422,624 B2* | 4/2013 | Christoph | G01B 15/00 |
| | | | 378/4 |
| 8,949,071 B2* | 2/2015 | Takanashi | G01B 7/282 |
| | | | 702/167 |
| 9,080,867 B2* | 7/2015 | Lippuner | G01B 5/004 |
| 9,625,257 B2* | 4/2017 | Christoph | G01N 23/046 |
| 9,625,353 B2* | 4/2017 | Takahashi | G01B 3/30 |
| 9,645,217 B2* | 5/2017 | Morfino | G01R 35/00 |
| 10,041,779 B2* | 8/2018 | Masuta | G01B 5/201 |
| 10,415,955 B2* | 9/2019 | Haverkamp | G01B 11/005 |
| 10,415,958 B2* | 9/2019 | Nakatsukasa | G01B 11/25 |
| 10,495,455 B2* | 12/2019 | Pettersson | F21V 21/26 |
| 10,612,907 B2* | 4/2020 | Christoph | G01B 11/007 |
| 10,706,562 B2* | 7/2020 | Haverkamp | G01B 5/008 |
| 10,928,329 B2* | 2/2021 | Shafiei | G01N 21/9501 |
| 11,045,918 B2* | 6/2021 | Böck | B23Q 17/249 |
| 11,150,189 B1* | 10/2021 | Ke | G01N 21/6489 |
| 11,353,410 B2* | 6/2022 | Nakayama | G01N 23/18 |
| 11,371,828 B2* | 6/2022 | Haverkamp | G06T 7/60 |
| 11,455,203 B2* | 9/2022 | Ochiai | G06F 11/0751 |
| 2014/0152805 A1* | 6/2014 | Saeki | G01B 21/047 |
| | | | 348/94 |
| 2015/0211847 A1* | 7/2015 | Abe | G01B 21/04 |
| | | | 33/503 |
| 2015/0253125 A1* | 9/2015 | Pettersson | G01B 21/047 |
| | | | 345/419 |
| 2015/0285616 A1* | 10/2015 | Jordil | H04N 7/18 |
| | | | 33/503 |
| 2015/0345932 A1* | 12/2015 | Wakai | G01B 21/047 |
| | | | 33/503 |
| 2015/0362310 A1* | 12/2015 | Taniguchi | G01B 11/24 |
| | | | 356/4.01 |
| 2016/0364869 A1* | 12/2016 | Siercks | G06K 7/1417 |
| 2022/0113260 A1* | 4/2022 | Ishii | G01B 11/30 |

FOREIGN PATENT DOCUMENTS

| | | |
|---|---|---|
| JP | 2014-115105 A | 6/2014 |
| JP | 2014-126381 A | 7/2014 |
| JP | 2018-072202 A | 5/2018 |

* cited by examiner

SHAPE CORRECTION DEVICE AND SHAPE CORRECTION METHOD BASED ON AMOUNT OF DEFORMATION MEASURED BY POINT MEASUREMENT SENSOR AND SURFACE MEASUREMENT SENSOR

TECHNICAL FIELD

The present invention relates to a surface inspection device for inspecting a surface of an inspection target, a shape correction device, a surface inspection method, and a shape correction method.

BACKGROUND ART

As one of technologies for performing smooth scanning along a measurement surface by a stylus and implementing highly accurate and high-speed shape measurement, PTL 1 describes that a relative position of a probe with respect to the measurement surface is repeated, the relative position including a parallel movement of moving the stylus with respect to the measurement surface by a specified distance in a direction parallel to the measurement surface, and an orthogonal movement of moving the probe in a normal direction of the measurement surface calculated from a difference between a current stylus position and a past stylus position in such a manner that a size in the normal direction in the measurement surface of a stylus displacement vector including a displacement amount and a displacement direction of a position of the stylus with respect to the probe becomes a set value of a predetermined pressing amount.

CITATION LIST

Patent Literature

PTL 1: JP 2014-115105 A

SUMMARY OF INVENTION

Technical Problem

Die casting is a casting method in which molten metal such as an aluminum alloy is press-fitted into a precise mold to form a thin and high-strength casting.

In a molded product manufactured by such an injection molding method such as die casting, warpage, bending, or the like of the product itself may occur. For this reason, in a molded product manufacturing process, a pressing force in a reverse direction may be applied to the warpage or bending of the molded product by a pressing device to correct the warpage or bending.

In order to perform the correction with high accuracy, it is desirable to measure a surface shape of the product after correction and appropriately adjust subsequent correction conditions, or measure a shape of the product before correction and determine and execute the correction conditions based on the measurement result.

As a part of the technology of measuring the surface shape, in PTL 1 described above, the shape of the measurement surface is measured by performing scanning while bringing the stylus into contact with the measurement surface, and sequentially reading coordinates and an inclination of the stylus, and the parallel movement of moving the stylus by a specified distance in a direction parallel to the measurement surface and the orthogonal movement of moving the probe in the normal direction of the measurement surface are repeated to smoothly operate the stylus and implement highly accurate shape measurement.

However, since a shape measurement device described in PTL 1 performs scanning while bringing the stylus into contact, there is a problem that it takes time to measure the shape.

Here, the warpage or bending of the molded product occurs due to residual stress and strain distribution remaining without uniform plastic deformation when dimensions of the product are determined in the manufacturing process. This is due to a change in operating conditions of a manufacturing facility and physical property conditions of a material.

Therefore, it is desirable to measure warpage or bending of continuously manufactured products online, and adjust the operating conditions of the manufacturing facility when the warpage or bending gradually increases. Here, in the shape measurement device described in PTL 1, since it takes time to measure the shape, there is a problem that it is difficult to measure the warpage or bending of the continuously manufactured products online, or a bottleneck is caused.

The same problem occurs also in a case where the surface shape before correction is measured and reflected in correction.

An object of the present invention is to provide a surface inspection device capable of evaluating a shape of a molded product such as a die-cast product with high accuracy in a shorter time than in the related art, a shape correction device, a surface inspection method, and a shape correction method.

Solution to Problem

The present invention includes a plurality of means for solving the above-described problems, and an example thereof includes: a point measurement unit that measures each of positions of predetermined points set on a surface of an inspection target; a surface measurement unit that measures a shape of a predetermined surface including the plurality of predetermined points by simultaneously measuring positions of a plurality of points of the inspection target; and a computation unit that obtains an amount of deformation of the inspection target from a reference shape based on the positions of the predetermined points measured by the point measurement unit and a normal direction of the predetermined surface measured by the surface measurement unit.

Advantageous Effects of Invention

According to the present invention, the shape of the molded product can be evaluated with high accuracy in a shorter time than in the related art. Problems, configurations, and effects other than those described above will become apparent by the following description of embodiments.

DESCRIPTION OF EMBODIMENTS

Figure 1:
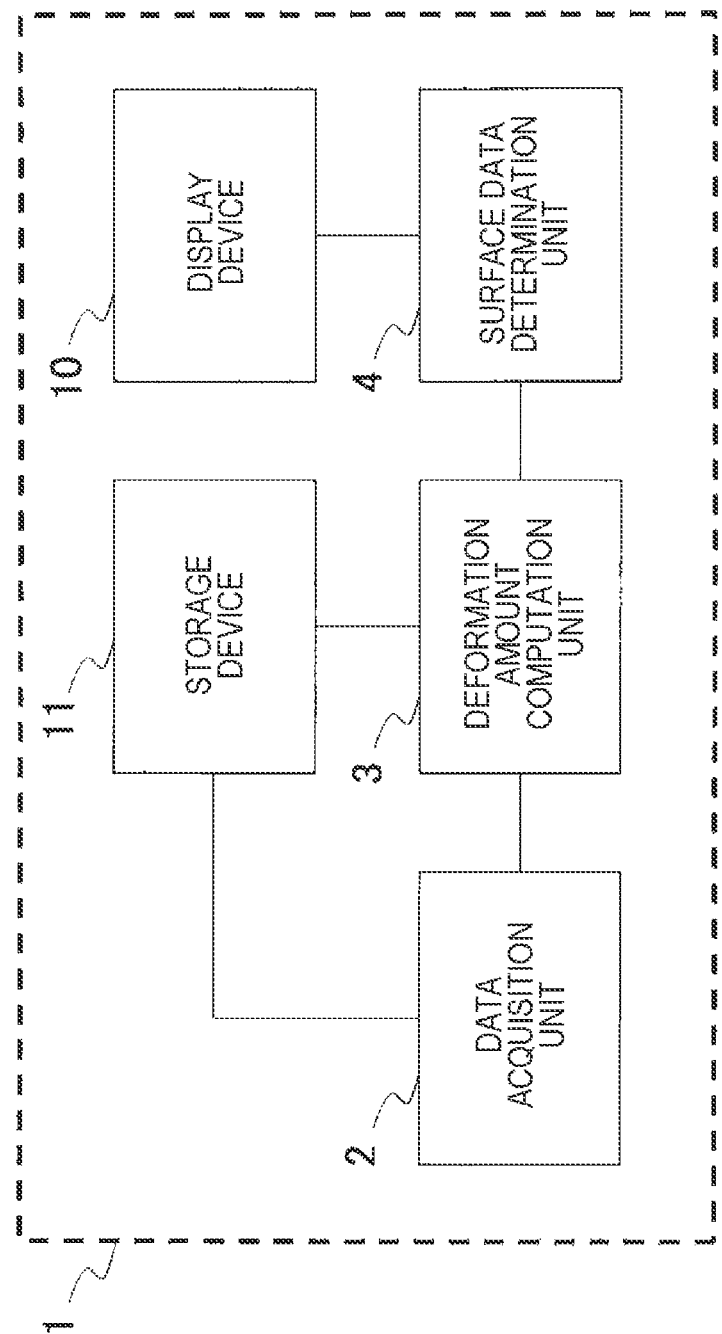
FIG. 1 is a system configuration diagram of a surface inspection device according to a first embodiment of the present invention.

Hereinafter, embodiments of a surface inspection device, a shape correction device, a surface inspection method, and a shape correction method of the present invention will be described with reference to the drawings. Note that, in the drawings used in the present specification, the same or corresponding constituent elements are denoted by the same reference signs, and a repeated description of these constituent elements may be omitted.

Further, in each of the following embodiments, a device and a method for inspecting a surface of a cast product formed by die casting or the like, and a device and a method for correcting a shape of a cast product will be described. However, a molded product that is an inspection target in the present invention is not limited to a cast product produced by die casting, and can be applied to a cast product produced by other various methods. In addition, a material is not limited to metal, and can also be applied to a resin and the like.

First Embodiment

A surface inspection device and a surface inspection method according to a first embodiment of the present invention will be described with reference to FIGS. 1 to 6.

Figure 2:
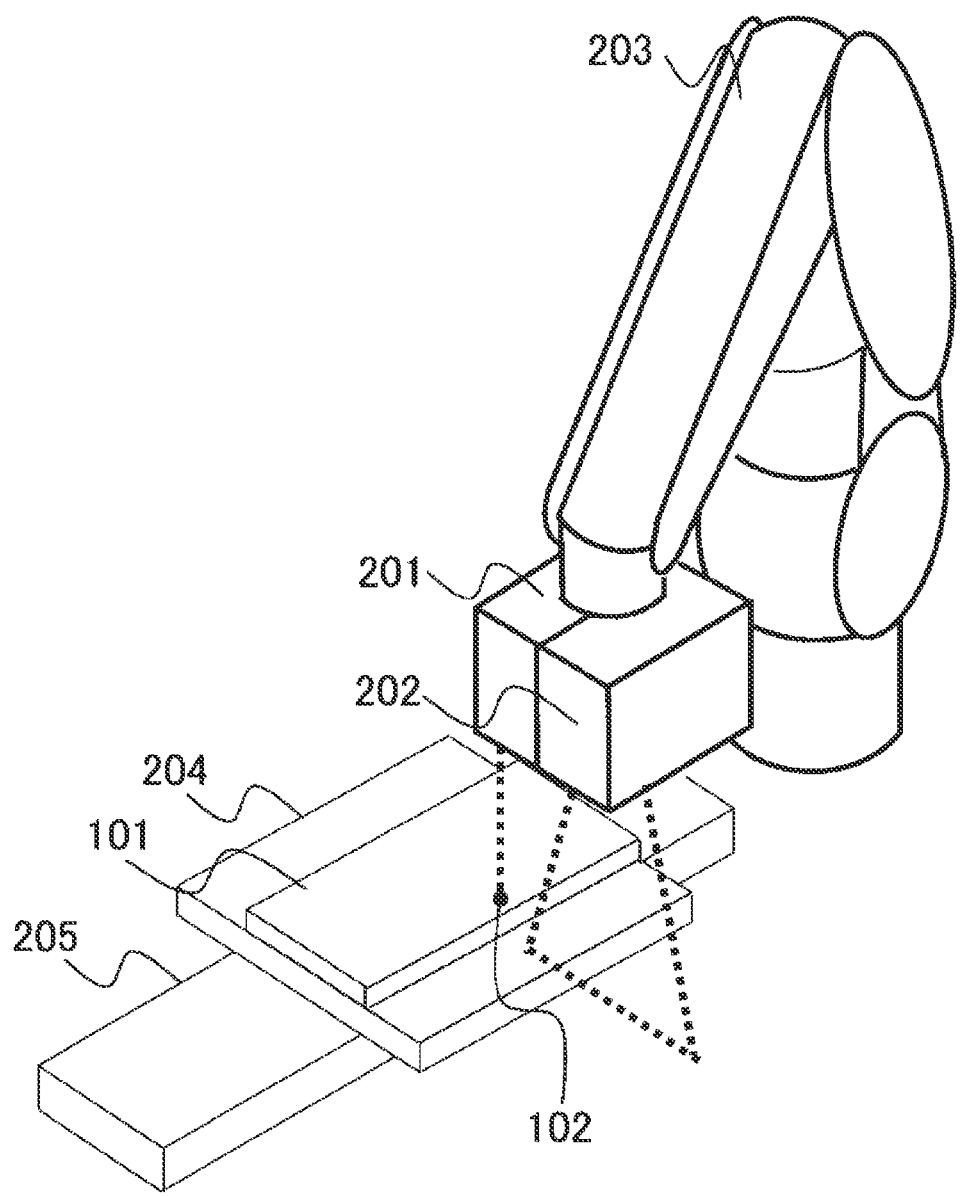
FIG. 2 is a schematic view illustrating measurement performed by a point measurement sensor of a data acquisition unit of the surface inspection device of the first embodiment.
Figure 3:
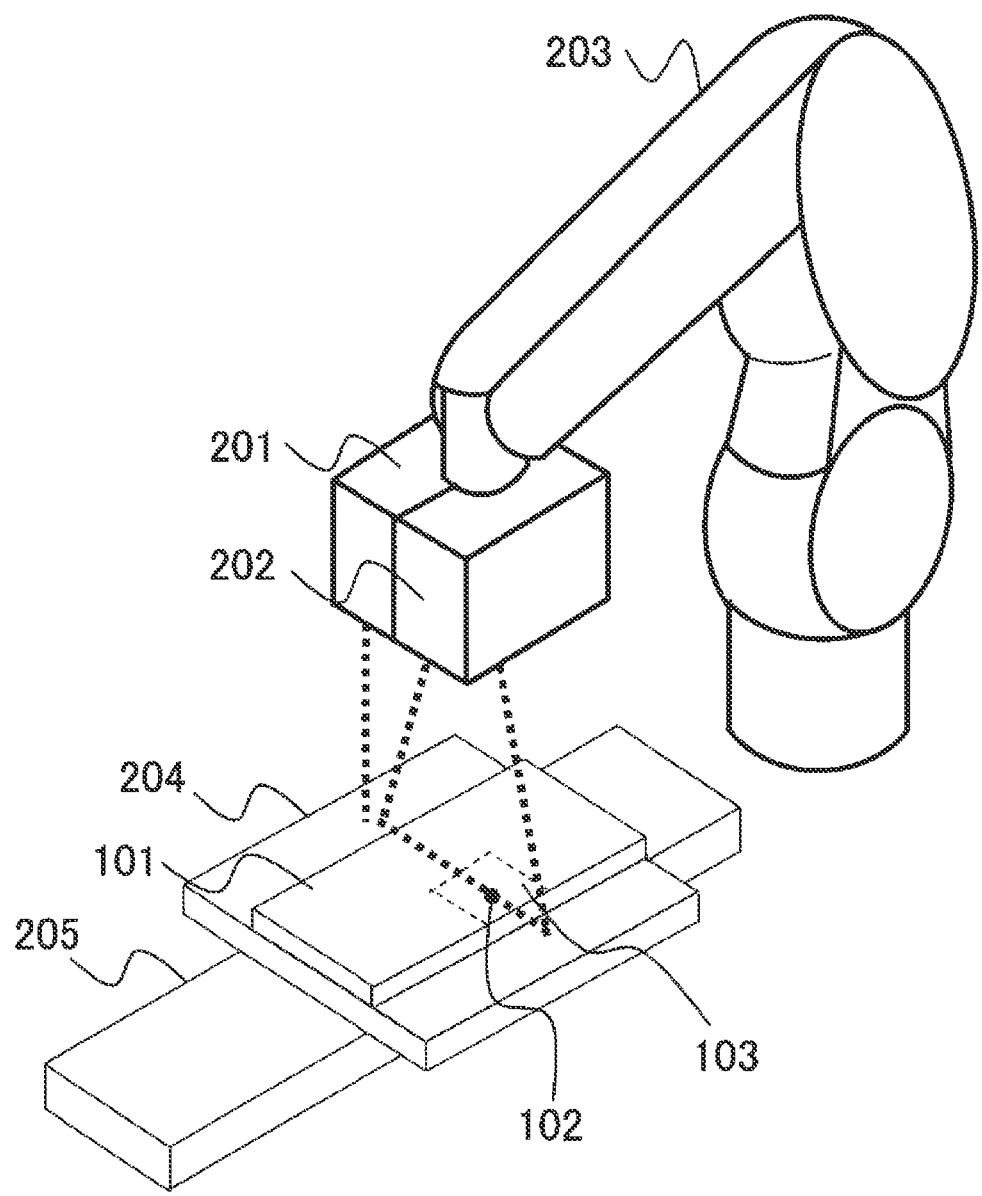
FIG. 3 is a schematic view illustrating measurement performed by a surface measurement sensor of the data acquisition unit of the surface inspection device of the first embodiment.
Figure 4:
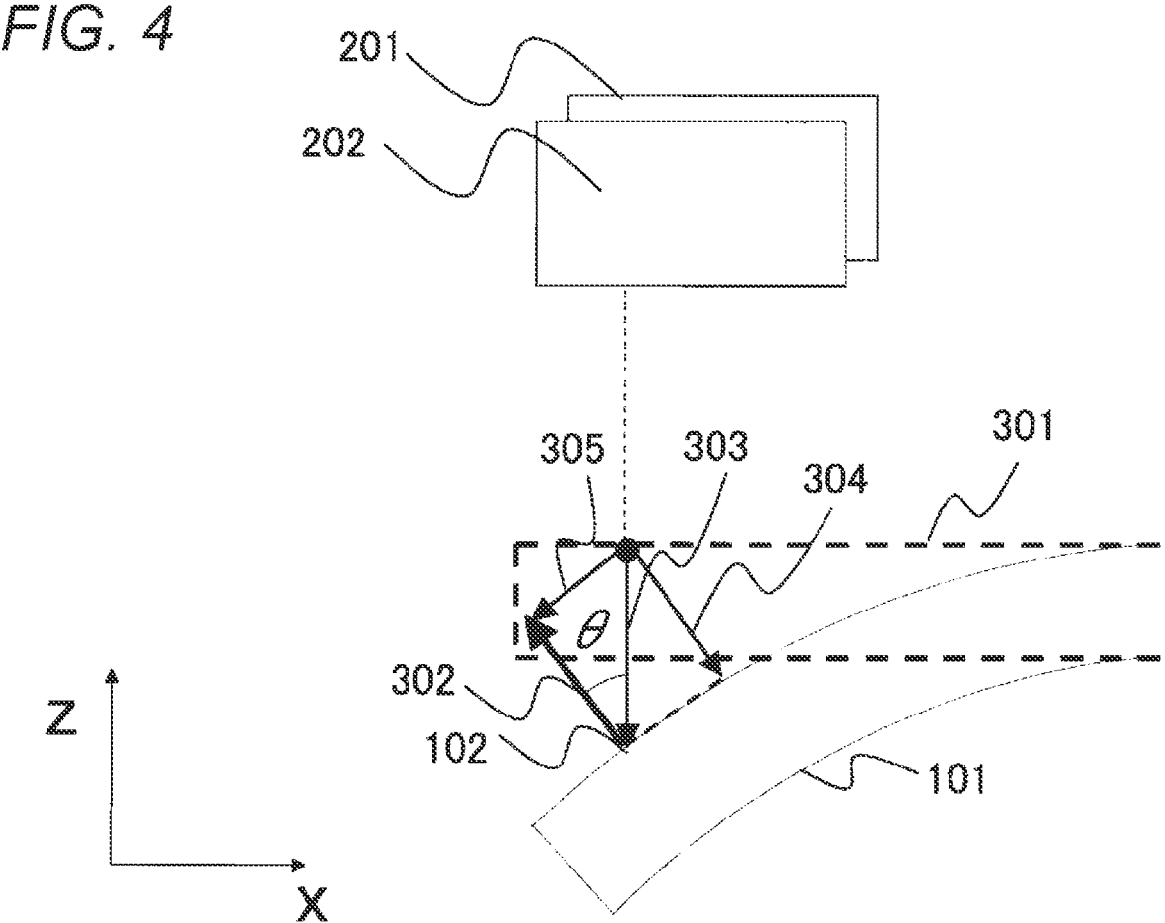
FIG. 4 is a diagram for describing a method of calculating an amount of deformation of an inspection target from a reference shape in the surface inspection device of the first embodiment.
Figure 5:
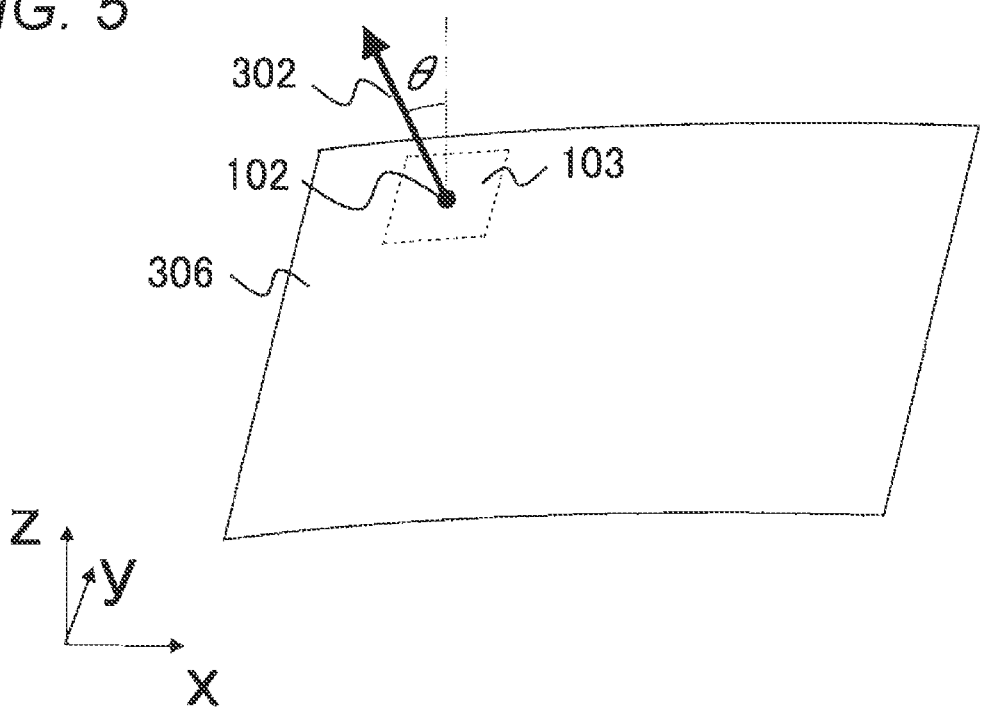
FIG. 5 is a diagram for describing a method of calculating a normal vector at a predetermined point of the inspection target from surface measurement data of the inspection target in the surface inspection device of the first embodiment.

First, an overall configuration of the surface inspection device will be described with reference to FIGS. 1 to 5. FIG. 1 is a system configuration diagram of the surface inspection device according to the first embodiment of the present invention. FIG. 2 is a schematic view illustrating measurement of a predetermined point 102 of an inspection target 101 by a point measurement sensor 201. FIG. 3 is a schematic view illustrating measurement of a predetermined surface 103 including the predetermined point 102 of the inspection target 101 by a surface measurement sensor 202. FIG. 4 is a diagram for describing a method of calculating an amount of deformation of the inspection target 101 from a reference shape. FIG. 5 is a diagram for describing a method of calculating a normal vector at the predetermined point 102 of the inspection target 101 from surface measurement data 306 of the inspection target 101.

In FIG. 1, a surface inspection device 1 is a device for inspecting a surface of an inspection target 101 (see FIG. 2), and includes a data acquisition unit 2, a deformation amount computation unit 3, a surface data determination unit 4, a storage device 11, and a display device 10.

The data acquisition unit 2 acquires position data of the predetermined point 102 on the surface of the inspection target 101 and surface measurement data of the predetermined surface 103 including the predetermined point 102, and outputs the acquired data to the deformation amount computation unit 3 and the storage device 11. Note that the predetermined point 102 is not limited to one point, and may refer to a plurality of points.

As illustrated in FIG. 2, the data acquisition unit 2 includes a point measurement sensor 201, a surface measurement sensor 202, a robot 203, an inspection stage 204, and a conveyance mechanism 205.

The point measurement sensor 201 is a measuring instrument that measures each position of the predetermined point 102 set on the surface of the inspection target 101, and is, for example, an optical measuring instrument such as a laser displacement meter or a white light interferometer, or a contact-type shape measuring instrument. In particular, it is desirable that the point measurement sensor 201 is a contact-type sensor that comes into contact with the inspection target 101 in terms of measurement accuracy.

As illustrated in FIG. 2, the point measurement sensor 201 is installed at a distal end of the robot 203, for example. The robot 203 is driven to relatively move the point measurement sensor 201 with respect to the inspection target 101, and distances between the point measurement sensor 201 and the predetermined point 102 of the inspection target can be sequentially read, thereby obtaining the position data of the predetermined point 102 of the inspection target 101.

The surface measurement sensor 202 is a measuring instrument that measures a shape of the predetermined surface 103 including a plurality of predetermined points 102 by simultaneously measuring positions of a plurality of points of the inspection target 101, and is, for example, an optical measuring instrument such as a 3D scanner, a laser displacement meter, or a stereo camera. It is desirable that the surface measurement sensor 202 is a non-contact-type sensor that measures the shape without coming into contact with the inspection target 101 in terms of a measurement speed.

As illustrated in FIG. 3, the surface measurement sensor 202 is also installed at the distal end of the robot 203, for example, similarly to the point measurement sensor 201. Preferably, it is desirable that the surface measurement sensor 202 and the point measurement sensor 201 are arranged in parallel at the distal end of the robot 203. The surface measurement data 306 of the inspection target 101 can be obtained by driving the robot 203 to relatively move the surface measurement sensor 202 with respect to the inspection target 101.

It is desirable that the measurement performed by the point measurement sensor 201 and the measurement performed by the surface measurement sensor 202 are performed simultaneously.

In a case of the inspection target 101 in which a place where the frequency of occurrence of deformation such as warpage is high is known, the predetermined point 102, which is a measurement target of the point measurement sensor 201, can be set in such a place where the frequency is high. In addition, the predetermined point 102 can be appropriately determined according to various conditions such as a point on a plane that is at a predetermined distance from the place where the frequency is high and a position that is at a predetermined distance from an end portion or a corner portion.

In addition, it is desirable that a range of the predetermined surface 103, which is a measurement target of the surface measurement sensor 202, is determined in such a manner that an index representing a variation in positions of a plurality of points included in the predetermined surface 103 is equal to or less than a certain threshold. As a result, the variation in positions of the plurality of points included in the predetermined surface 103 can be reduced, and an increase in directional variation of a normal vector of the predetermined surface 103 estimated from the positions of the plurality of points included in the predetermined surface 103 can be suppressed.

In addition, by not excessively narrowing the range of the predetermined surface 103, it is possible to secure a certain number of points included in the predetermined surface 103, offset the variation in individual positions, and ensure accuracy.

Therefore, it is desirable that the range of the predetermined surface 103 is determined in such a manner that the index representing the variation in positions of the plurality of points included in the predetermined surface 103 is equal to or less than a certain threshold and a range thereof is maximized.

The robot 203 is configured in such a manner that positions and angles of the point measurement sensor 201 and the surface measurement sensor 202 can be adjusted so that the point measurement sensor 201 and the surface measurement sensor 202 can measure the shape of the inspection target 101 from various angles. Thus, the data acquisition unit 2 is prevented from having to include a plurality of point measurement sensors 201 and a plurality of surface measurement sensors 202.

For example, in a case where the inspection target 101 has a planar shape or a rectangular parallelepiped shape, the robot 203 can use a two-axis moving mechanism capable of parallel movement with respect to the inspection target 101. In addition, in a case where the inspection target 101 has a complicated shape, a mechanism capable of three-axis movement can be used so that the inspection target 101 can be scanned in various directions.

The inspection stage 204 is a space for placing the inspection target 101. The inspection target 101 is placed on the inspection stage 204 by the hand of an inspector or using a robot, an articulated arm, or the like that grips the inspection target 101. The inspection stage 204 can include a mechanism capable of adjusting the position and angle of the inspection target 101 in a state where the position and angle of the point measurement sensor 201 are fixed.

Although not illustrated in FIGS. 2 and 3, the inspection stage 204 may include a mechanism for fixing the position and angle of the inspection target 101 and a sensor for confirming that the inspection target 101 is placed at the correct position and angle. Further, the inspection stage 204 can include a detachable member that fixes the inspection target 101 in accordance with the size and shape of the inspection target 101. Since the inspection stage 204 can attach and detach such a member, the data acquisition unit 2 can obtain the surface measurement data 306 for a plurality of types of inspection targets 101.

The conveyance mechanism 205 moves the inspection target 101 placed on the inspection stage 204 within a measurement range of the point measurement sensor 201 or the surface measurement sensor 202. After the measurement is completed, the inspection target 101 is moved to a position where the inspector can easily take the inspection target 101 or a position where a robot, an articulated arm, or the like that grips the inspection target 101 can take out the inspection target 101.

Note that in a case where the surface measurement sensor 202 is a measuring instrument that acquires the surface shape of the inspection target 101 by an optical cutting method, such as a laser displacement meter, the surface measurement sensor 202 can be relatively moved with respect to the inspection target 101 to measure the shape of the inspection target 101. At this time, the surface measurement sensor 202 can be moved by the robot 203, or the inspection target 101 can be moved by a scanning mechanism provided in the inspection stage 204.

Returning to FIG. 1, the deformation amount computation unit 3 obtains a normal direction of the predetermined surface 103 from the surface measurement data obtained by the surface measurement sensor 202. In addition, the amount of deformation of the inspection target 101 from the reference shape is obtained using the position data of the predetermined point 102 of the inspection target 101 measured by the point measurement sensor 201 and data of the normal direction, and the obtained amount of deformation is output to the surface data determination unit 4.

The amount of deformation calculated by the deformation amount computation unit 3 is, for example, an absolute value (magnitude) of a value of a difference between the surface shape of the inspection target 101 and the reference shape of the inspection target 101. Data of the reference shape of the inspection target 101 is data serving as a reference for the surface shape of the inspection target obtained from, for example, sound product data or design data, and is stored in the storage device 11. Note that the amount of deformation may be, for example, a distance from a reference position of the inspection target 101 or a distance from a surface including a plurality of reference positions.

More specifically, as illustrated in FIG. 4, in a case where the inspection target 101 is bent in a negative direction of a z axis with respect to a reference shape 301, the deformation amount computation unit 3 calculates the amount of deformation of the inspection target 101 from the reference shape at the predetermined point 102. The amount of deformation from the reference shape is calculated based on a magnitude of a displacement vector 303 from the reference shape 301 at the predetermined point 102 of the inspection target 101 and a normal vector 302 at the predetermined point 102 of the inspection target 101.

The displacement vector 303 of the displacement from the reference shape 301 at the predetermined point 102 of the inspection target 101 is calculated by taking a difference between a distance between the point measurement sensor 201 and the predetermined point 102 of the inspection target 101 acquired by the point measurement sensor 201 and a distance between the point measurement sensor 201 and the reference shape 301 acquired in advance. Alternatively, the displacement vector 303 may be calculated by acquiring a distance between the point measurement sensor 201 and another predetermined point 102 of the inspection target 101 in advance and taking a difference from the distance.

As illustrated in FIG. 5, the normal vector 302 at the predetermined point 102 of the inspection target 101 is calculated by extracting the predetermined surface 103 including the predetermined point 102 of the inspection target 101 from the surface measurement data 306 acquired by the surface measurement sensor 202.

By calculating the normal vector 302 at the predetermined point 102 of the inspection target 101, the displacement vector 303 from the reference shape 301 of the inspection target 101 can be decomposed into a vector 304 projected in a direction of the normal vector 302 and a vector 305 projected on the predetermined surface 103.

A magnitude of the vector 304 obtained by projecting the displacement vector 303 in the direction of the normal vector 302 is obtained by (magnitude of displacement vector 303)×Cos θ using θ in FIG. 4.

The vector 304 projected in the direction of the normal vector 302 represents a displacement vector in a direction perpendicular to the inspection target 101. Therefore, it can be said that the vector 304 projected in the direction of the normal vector 302 represents the amount of deformation of the inspection target 101 from the reference shape in consideration of an influence of a positional deviation of the corresponding point accompanying the deformation of the inspection target 101.

Further, a magnitude of the vector 305 obtained by projecting the displacement vector 303 on the predetermined surface 103 is obtained by (magnitude of displacement vector 303)×Sin θ using θ in FIG. 4. The vector 305 projected on the predetermined surface 103 represents a displacement vector in a horizontal direction with respect to the inspection target 101, and can be said to be a component corresponding to the warpage of the inspection target 101 in the deformation.

Here, in the deformation amount computation unit 3, alignment between point measurement data of the predetermined point 102 obtained by the point measurement sensor 201 and the surface measurement data of the predetermined surface 103 obtained by the surface measurement sensor 202 can be performed by, for example, deforming the surface measurement data 306 of the predetermined surface 103 obtained by the surface measurement sensor 202 using a template in accordance with the sound product data or design data to specify the surface measurement data 306 at the position of the predetermined point 102, but is not limited to this method.

The surface data determination unit 4 determines whether or not the inspection target 101 is a sound product (that is, whether or not it is a good product or a defective product) based on the amount of deformation of the inspection target 101 from the reference shape obtained by the deformation amount computation unit 3, thereby determining whether or not there is an abnormality in the shape of the inspection target 101.

The deformation amount computation unit 3 and the surface data determination unit 4 are implemented by a computer. The computer includes a computation device such as a central processing unit (CPU) for performing computation using various data, processing results, and the like, the storage device 11, the display device 10, an input/output interface (not illustrated for convenience of illustration), and the like. The computation device performs data processing according to a program stored in the storage device 11. In addition, this computer can display, on the display device 10, a data processing result of the computation device such as a determination result of the surface data determination unit 4.

Note that operation control processing performed by the computer implementing the deformation amount computation unit 3 and the surface data determination unit 4 may be integrated into one program, may be divided into a plurality of programs, or may be a combination thereof. Some or all of the programs may be implemented by dedicated hardware or may be modularized.

The display device 10 is a device for displaying a determination result of the surface data determination unit 4, data acquired by the surface inspection device 1, and a calculation result, and is a display device such as a liquid crystal display. Note that a touch panel type display device also serving as an input device can be used.

The storage device 11 is a device for storing a determination result of the surface data determination unit 4, data acquired by the data acquisition unit 2, and a computation result of the deformation amount computation unit 3, and is a recording medium such as a semiconductor memory such as a flash memory or a magnetic disk such as an HDD. In the storage device 11, various parameters and setting values for controlling an operation of each device of the surface inspection device 1, various computer programs for performing various pieces of display processing and the like are also recorded.

Figure 6:
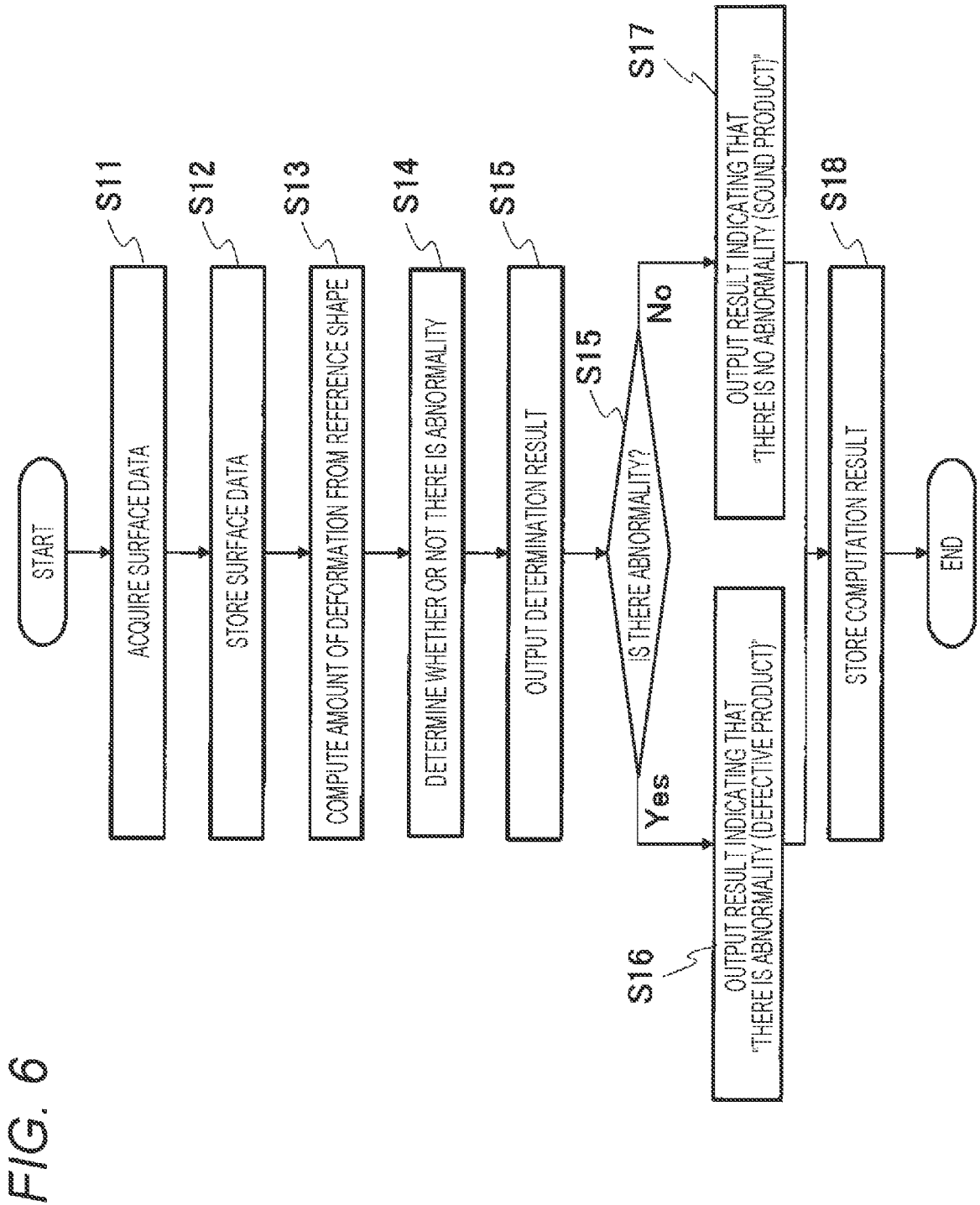
FIG. 6 is a flowchart illustrating a series of procedures of a surface inspection method according to the first embodiment of the present invention.

Next, the surface inspection method according to the present embodiment will be described with reference to FIG. 6. FIG. 6 is a flowchart illustrating a series of procedures of the surface inspection method according to the present embodiment.

The surface inspection method according to the present embodiment is suitably performed by the surface inspection device 1 illustrated in FIG. 1. Further, it is desirable that the surface inspection method according to the present embodiment is performed to confirm the degree of effect of correction pressing after correction processing in a case where the inspection target 101 is a die-cast product, but is not particularly limited to being performed after the correction processing.

As illustrated in FIG. 6, first, the data acquisition unit 2 acquires the position data of the predetermined point 102 of the inspection target 101 and the surface measurement data 306 of the predetermined surface including the predetermined point 102 of the inspection target 101 (Step S11). Step S11 corresponds to a point measurement step of measuring each of the positions of the predetermined points 102 set on the surface of the inspection target 101, and a surface measurement step of performing surface measurement of the shape of the predetermined surface 103 including the plurality of predetermined points 102 by simultaneously measuring positions of a plurality of points of the inspection target 101.

In addition, it is desirable that the point measurement step and the surface measurement step in Step S11 are performed simultaneously.

Next, the data acquisition unit 2 stores the point measurement data and the surface measurement data acquired in Step S11 in the storage device 11 (Step S12).

Next, the deformation amount computation unit 3 performs computation processing of obtaining a difference between the position data of the predetermined point 102 of the inspection target 101 and the position data of the reference shape of the inspection target 101, and obtains a difference value between the surface shape of the inspection target 101 and the reference shape (Step S13). Step S13 corresponds to a computation step of obtaining the amount of deformation of the inspection target 101 from the reference shape based on the position of the predetermined point 102 measured in the point measurement step and the normal direction of the predetermined surface 103 measured in the surface measurement step.

Next, the surface data determination unit 4 determines whether or not there is an abnormality in the shape of the inspection target 101 based on the amount of deformation of the inspection target 101 from the reference shape obtained in Step S13 (Step S14).

In Step S14, the surface data determination unit 4 determines that there is an abnormality in the surface shape in a case where the amount of deformation of the inspection target 101 from the reference shape is larger than a threshold, and the surface data determination unit 4 determines that there is no abnormality in the surface shape in a case where the amount of deformation is equal to or smaller than the threshold. The threshold can be arbitrarily determined in advance.

Then, the surface data determination unit 4 determines whether or not there is an abnormality in the shapes of all the predetermined points 102 of the inspection target 101 (Step S15). In a case where there is no abnormality in the shapes of all the predetermined points 102, the surface data determination unit 4 determines that the inspection target 101 is a sound product, and the processing proceeds to Step S17.

Next, the surface data determination unit 4 outputs a determination result indicating that there is no abnormality in the shape of the inspection target 101 and the inspection target 101 is a sound product to the display device 10 (Step S17). Thereafter, the processing proceeds to Step S18.

On the other hand, in determining whether or not there is an abnormality in the shapes of all the predetermined points 102 of the inspection target 101 (Step S15), in a case where there is an abnormality in the shape of at least one predetermined point 102, it is determined that the inspection target 101 is a defective product, and the processing proceeds to Step S16.

Next, the surface data determination unit 4 outputs a determination result indicating that there is an abnormality in the shape of the inspection target 101 and the inspection target 101 is a defective product to the display device 10 (Step S16). Thereafter, the processing proceeds to Step S18.

Next, the surface data determination unit 4 stores each determination result in the storage device 11 (Step S18). The storage device 11 can also store other computation results of the surface inspection device 1.

Next, effects of the present embodiment will be described.

The surface inspection device 1 of the first embodiment of the present invention described above includes: the point measurement sensor 201 that measures each of the positions of the predetermined points 102 set on the surface of the inspection target 101; the surface measurement sensor 202 that measures the shape of the predetermined surface 103 including the plurality of predetermined points 102 by simultaneously measuring positions of a plurality of points of the inspection target 101; and the deformation amount computation unit 3 that obtains the amount of deformation of the inspection target 101 from the reference shape based on the positions of the predetermined points 102 measured by the point measurement sensor 201 and the normal direction of the predetermined surface 103 measured by the surface measurement sensor 202.

Therefore, although the number of measurement points is smaller than that in the related art, the amount of deformation of the inspection target 101 which is a molded product such as a die-cast product from the reference shape 301 can be evaluated with high accuracy in a shorter time than in the related art.

In addition, since the magnitude of the vector 304 obtained by projecting the displacement vector from the reference shape of the inspection target 101 in the normal direction of the predetermined surface 103 is obtained as the amount of deformation, a value corresponding to an absolute amount of deformation can be grasped, and a more accurate amount of deformation can be evaluated.

Furthermore, as the magnitude of the vector 305 obtained by projecting the displacement vector from the reference shape of the inspection target 101 on the predetermined surface 103 as the amount of deformation, a value corresponding to the amount of warpage of the inspection target 101 can be grasped, so that the amount of deformation can be evaluated with higher accuracy.

In addition, since the point measurement sensor 201 is a contact-type sensor that comes into contact with the inspection target 101, and the surface measurement sensor 202 is a non-contact-type sensor that measures the shape without coming into contact with the inspection target 101, a time required for measuring the inspection target 101 can be shortened, which contributes to obtaining the amount of deformation more quickly.

Furthermore, by simultaneously performing the measurement by the point measurement sensor 201 and the measurement by the surface measurement sensor 202, the time required for measuring the inspection target 101 can be shortened, which contributes to obtaining the amount of deformation more quickly.

Further, the surface data determination unit 4 determines whether or not there is an abnormality in the shape of the inspection target 101 based on the amount of deformation, so that an inspection burden on the inspector can be reduced, and a high-precision molded product can be more easily manufactured than before.

Second Embodiment

Figure 7:
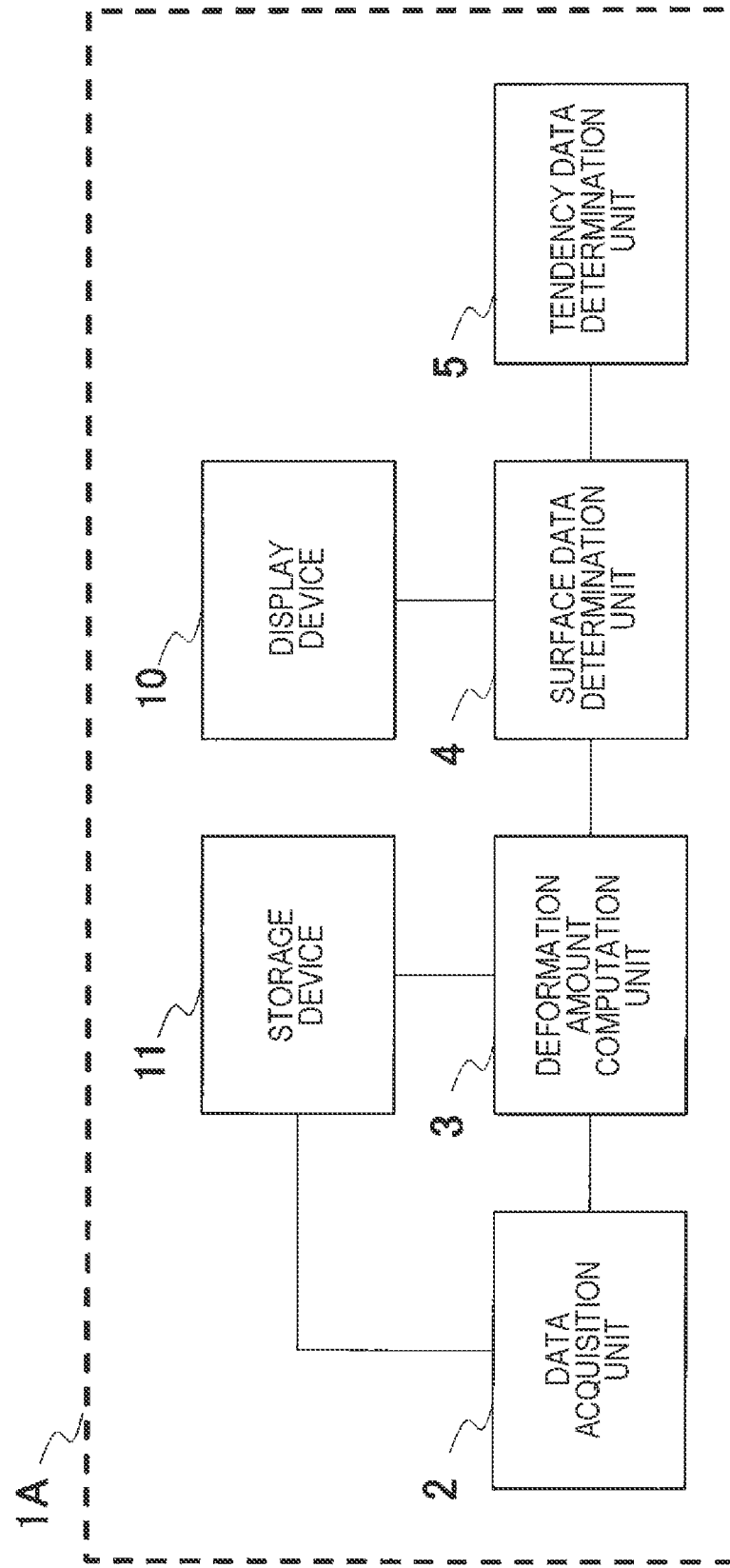
FIG. 7 is a system configuration diagram of a surface inspection device according to a second embodiment of the present invention.
Figure 8:
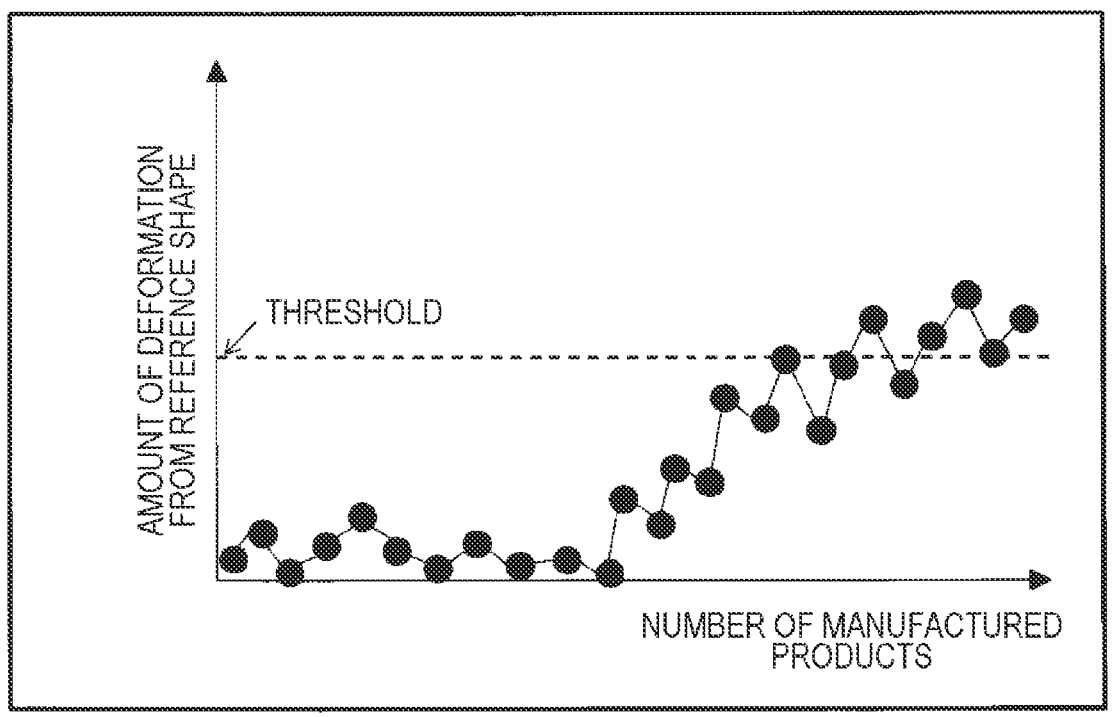
FIG. 8 is a diagram illustrating a time-series change in amount of deformation from a reference shape with respect to the number of manufactured products in the surface inspection device of the second embodiment.
Figure 9:
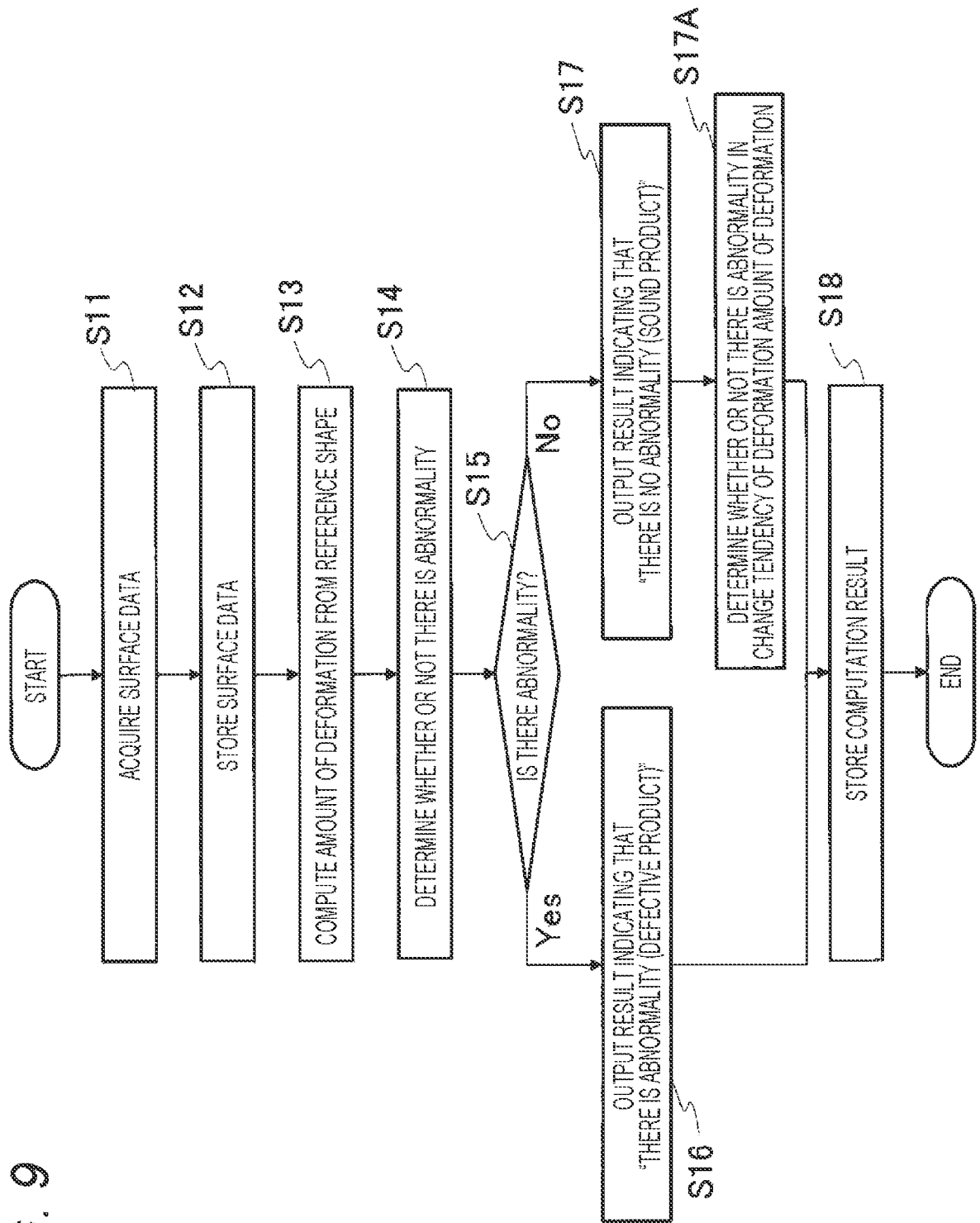
FIG. 9 is a flowchart illustrating a series of procedures of a surface inspection method according to the second embodiment.

A surface inspection device and a surface inspection method according to a second embodiment of the present invention will be described with reference to FIGS. 7 to 9. FIG. 7 is a system configuration diagram of the surface inspection device according to the second embodiment of the present invention. FIG. 8 is a diagram illustrating a time-series change in amount of deformation of the inspection target 101 from the reference shape 301 with respect to the number of manufactured products. FIG. 9 is a flowchart illustrating a series of procedures of the surface inspection method according to the present embodiment.

As illustrated in FIG. 7, a surface inspection device 1A of the present embodiment includes a tendency data determination unit 5 in addition to the surface inspection device 1 described in the first embodiment, and the tendency data determination unit 5 is included in the computation unit in addition to a deformation amount computation unit 3 and a surface data determination unit 4.

The tendency data determination unit 5 analyzes a change tendency by analyzing a time-series change in amount of deformation of the inspection target 101 from the reference shape, and determines whether or not there is an abnormality in the change tendency of the amount of deformation.

In FIG. 8, the magnitude of the vector 304 and/or the vector 305 projected in the direction of the normal vector 302 of the amount of deformation from the reference shape 301 is plotted.

More specifically, the tendency data determination unit 5 continuously monitors the magnitude of the vector 304 or 305, and outputs a determination result indicating that there is an abnormality to the display device 10 when detecting a timing at which the magnitude of the vector 304 or 305 exceeds a threshold. As a result, it is possible to warn a worker of a time when the bending of the inspection target gradually increases, and the worker can check a facility state or update facility conditions at an appropriate time by receiving the warning.

Note that, in the tendency data determination unit 5, for example, a plurality of thresholds such as a threshold for issuing an alarm or a threshold for abnormality determination can be provided as the threshold. In addition, it is possible to compute a time when the amount of deformation reaches one or more thresholds from transition of the amount of deformation, and to output and display, on the display device 10, a timing at which it is likely that a measure such as maintenance is required.

Next, the surface inspection method for the inspection target 101 in the present embodiment will be described with reference to FIG. 9. The surface inspection method according to the present embodiment is preferably performed by the surface inspection device 1A.

Each step of the flowchart illustrated in FIG. 9 is basically the same as each step of the first embodiment illustrated in FIG. 6, but this flowchart is different from the flowchart of the first embodiment illustrated in FIG. 6 in that this flowchart includes Step S17A of determining whether or not there is an abnormality in the change tendency of the amount of deformation of the inspection target 101 from the reference shape 301.

After Step S17, the tendency data determination unit 5 analyzes the change tendency by analyzing the time-series change in amount of deformation of the inspection target 101 from the reference shape, and determines whether or not there is an abnormality in the change tendency of the amount of deformation (Step S17A). Step S17A corresponds to a tendency determination step. A criterion for abnormality determination and the like can be determination using the threshold as described above or the like.

Other configurations and operations are substantially the same as those of the surface inspection device and the surface inspection method of the first embodiment described above, and details are omitted.

Also in the surface inspection device and the surface inspection method of the second embodiment of the present invention, substantially the same effects as those of the surface inspection device and the surface inspection method of the first embodiment described above can be obtained.

In addition, the surface inspection device 1A further includes the tendency data determination unit 5, analyzes the change tendency by analyzing the time-series change in amount of deformation, and determines whether or not there is an abnormality in the change tendency of the amount of deformation, whereby the presence or absence of the abnormality in the change tendency of the amount of deformation of the inspection target 101 from the reference shape can be automatically obtained. As a result, in addition to quickly grasping the amount of deformation, the worker can quickly grasp a sign indicating that the bending of the inspection target 101 gradually increases. Therefore, it is possible to more quickly take an appropriate action as compared with the related art.

Third Embodiment

Figure 10:
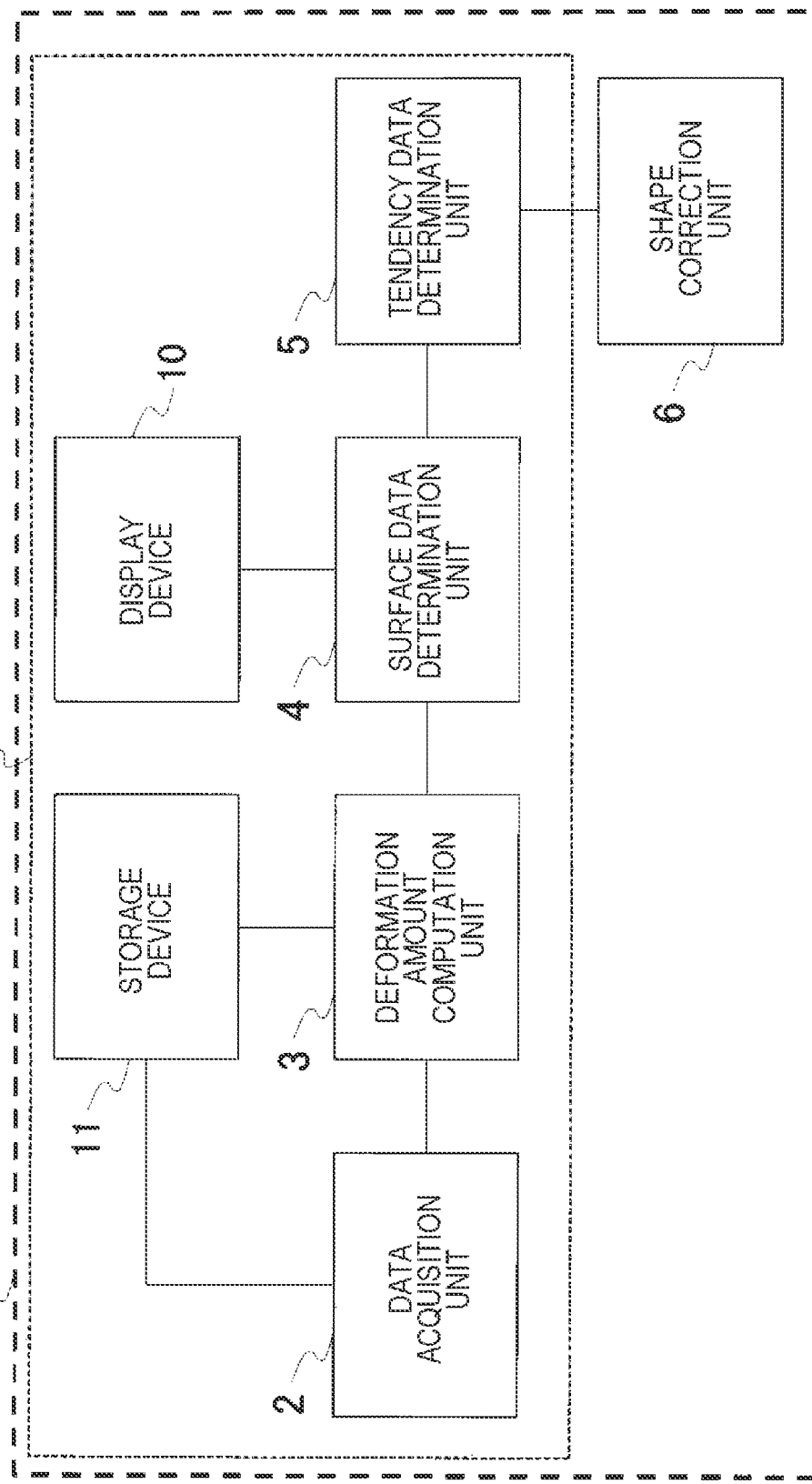
FIG. 10 is a system configuration diagram of a surface inspection device according to a third embodiment of the present invention.
Figure 11:
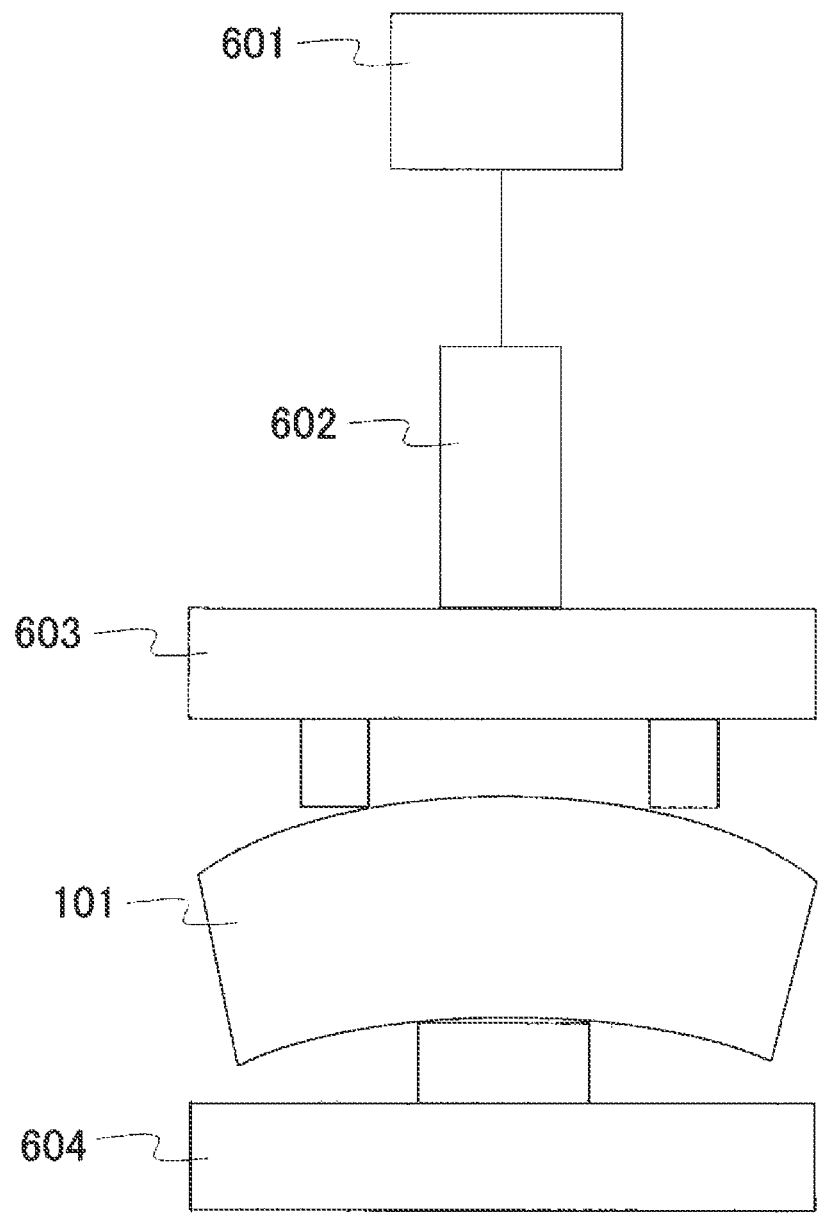
FIG. 11 is a schematic view of a shape correction unit of the surface inspection device of the third embodiment.
Figure 12:
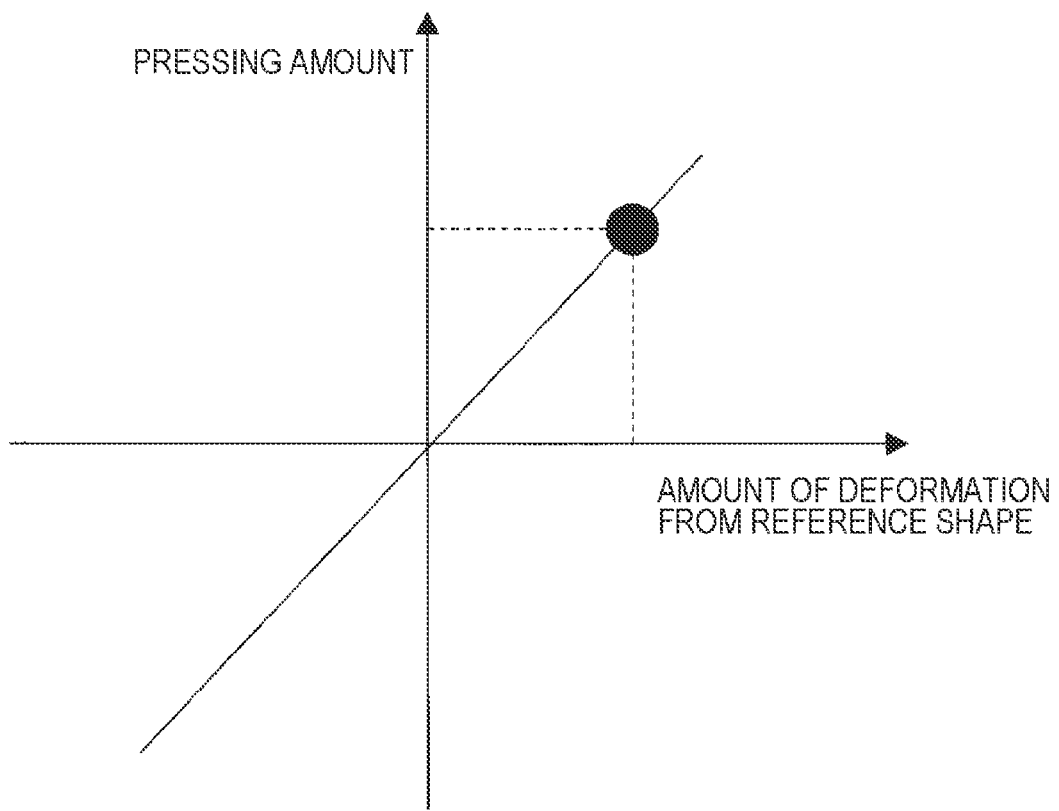
FIG. 12 is a diagram illustrating an example of a calibration curve for calculating a pressing amount of a pressing device from an amount of deformation from a reference shape in the surface inspection device of the third embodiment.
Figure 13:
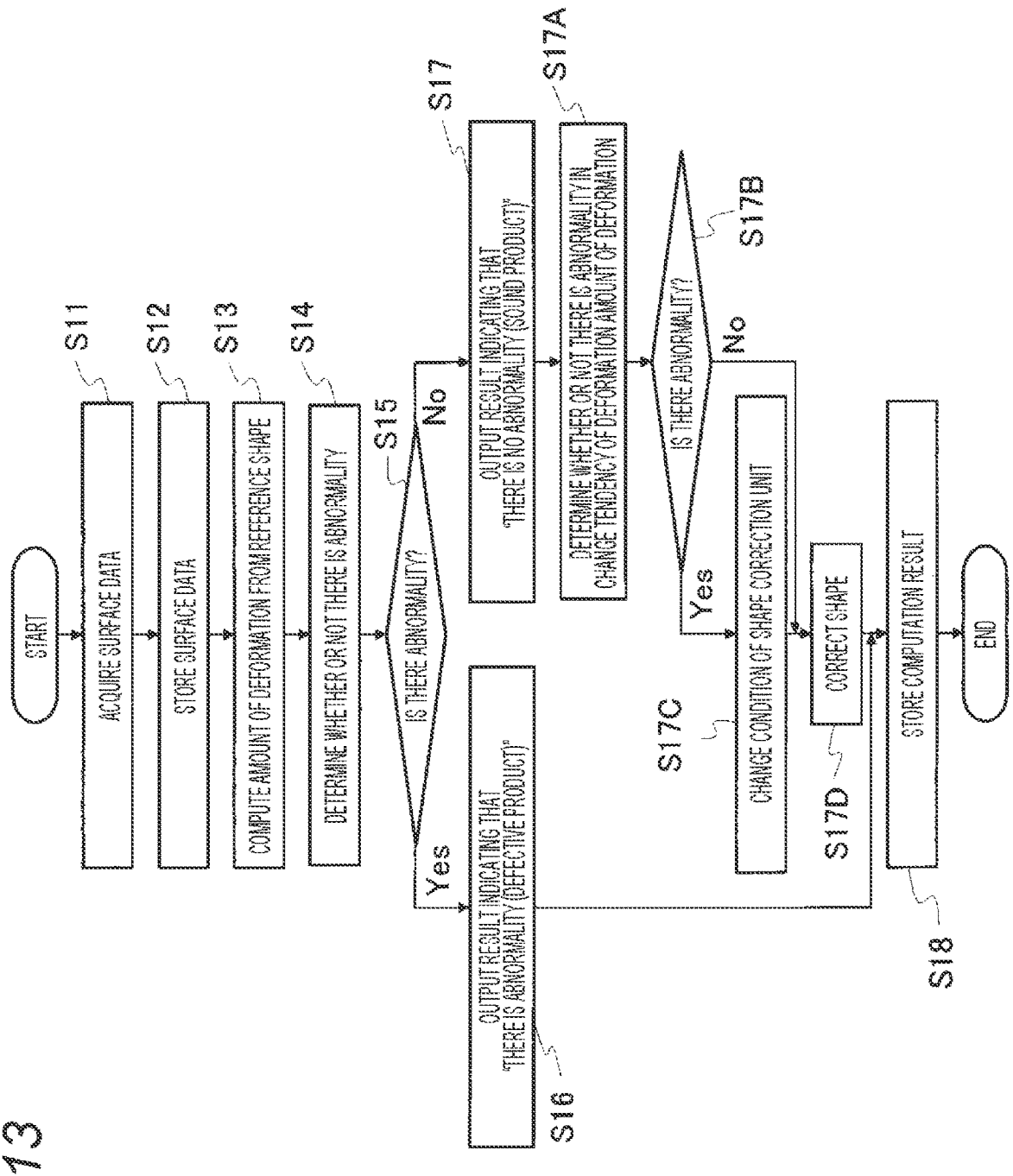
FIG. 13 is a flowchart illustrating a series of procedures of a surface inspection method according to the third embodiment.

A shape correction device and a shape correction method according to a third embodiment of the present invention will be described with reference to FIGS. 10 to 13. FIG. 10 is a system configuration diagram of a surface inspection device according to the third embodiment of the present invention. FIG. 11 is a schematic diagram of a shape correction unit 6. FIG. 12 is a diagram illustrating an example of a calibration curve for calculating a pressing amount of a pressing device from the amount of deformation from the reference shape in the surface inspection device. FIG. 13 is a flowchart illustrating a series of procedures of the shape correction method according to the present embodiment.

As illustrated in FIG. 10, a shape correction device 7 of the present embodiment includes the surface inspection device 1A illustrated in the second embodiment and a shape correction unit that corrects the deformation of the inspection target 101 based on the amount of deformation measured by the surface inspection device 1A.

A shape correction unit 6 calculates the pressing amount of the pressing device based on the amount of deformation of the inspection target 101 from the reference shape, and performs correction of the inspection target 101 based on the obtained pressing amount.

As illustrated in FIG. 11, for example, the shape correction unit 6 is a device in which a servomotor 601 drives a cylinder 602 to press a movable die 603 of the pressing device so that the inspection target 101 is sandwiched and pressed between the movable die 603 and a fixed die 604, thereby correcting the shape of the inspection target 101.

As illustrated in FIG. 12, a relationship between the amount of deformation from the reference shape 301 and the pressing amount of the movable die 603, in which the warpage or bending of the inspection target 101 is reduced, is acquired in advance as the calibration curve, and the amount of deformation from the reference shape 301 is converted into the pressing amount of the movable die 603 by using the calibration curve, whereby the pressing amount of the movable die 603 can be automatically set to an appropriate value.

In the present embodiment, since acquisition of surface data of the inspection target 101 is performed on the inspection target 101 after shape correction performed by the shape correction unit 6, a condition of the shape correction unit 6 is reflected on the inspection target 101 whose shape has been corrected after the acquisition of the surface data of the inspection target 101.

Note that the surface data of the inspection target 101 may be acquired before the shape correction or before and after the shape correction.

In FIG. 10, a case where the shape correction device 7 includes the surface inspection device 1A of the second embodiment as the surface inspection device is described, but the surface inspection device included in the shape correction device 7 is not limited to the surface inspection device 1A of the second embodiment, and can be the surface inspection device 1 of the first embodiment. In this case, it is desirable that the shape correction unit 6 is connected to the surface data determination unit 4 or the deformation amount computation unit 3.

Next, the shape correction method for the inspection target 101 in the present embodiment will be described with reference to FIG. 13. The surface inspection method according to the present embodiment is preferably performed by the shape correction device 7.

Basically, in the flowchart illustrated in FIG. 13, in addition to each step of the second embodiment illustrated in FIG. 9, a step according to determination of whether or not there is an abnormality in the change tendency of the amount of deformation of the inspection target 101 from the reference shape 301 in Step S17A is performed after the determination, and a step of actually performing the correction is added.

In the present embodiment, in a case where it is determined in Step S17A that there is no abnormality (Step S17B), the processing proceeds to Step S17D.

On the other hand, in a case where it is determined that there is an abnormality (Step S17B), the processing proceeds to Step S17C, and the pressing amount of the movable die 603 of the shape correction unit 6 is changed based on the amount of deformation calculated in Step S13 (Step S17C).

Thereafter, the shape correction unit 6 performs correction of the inspection target 101 by using the pressing amount of the movable die 603 changed in Step S17C or the original pressing amount of the movable die 603 (Step S17D). Thereafter, the processing proceeds to Step S18. Step S17D corresponds to a shape correction step of correcting the deformation of the inspection target 101 based on the amount of deformation measured in a surface inspection step.

Note that, in a case where the surface inspection device of the first embodiment is included, it is desirable to directly proceed to Step S17D after Step S17 of FIG. 6, change the pressing amount of the movable die 603 based on the measured amount of deformation, and perform a correction step of correcting the deformation of the inspection target 101.

Other configurations and operations of the surface inspection device and the surface inspection method are substantially the same as those of the surface inspection device and the surface inspection method of the first and second embodiments described above, and details thereof are omitted.

Since the shape correction device 7 of the third embodiment of the present invention includes the surface inspection device 1 of the first embodiment or the surface inspection device 1A of the second embodiment described above and the shape correction unit that corrects the deformation of the inspection target 101 based on the amount of deformation measured by the surface inspection device 1 or 1A, the amount of deformation can be quickly evaluated with high accuracy. Therefore, the pressing amount of the movable die can be automatically set to an appropriate value based on the amount of deformation evaluated accurately and quickly. Accordingly, it is possible to obtain an effect that the shape of a molded product such as a die-cast product can be corrected with high accuracy in a short time.

Others

Note that the present invention is not limited to the embodiments described above, but includes various modifications.

For example, the above-described embodiments have been described in detail in order to explain the present invention in an easy-to-understand manner, and the present invention is not necessarily limited to those having all the configurations described.

Further, a part of the configuration of a certain embodiment can be replaced with the configuration of another embodiment. In addition, the configuration of a certain embodiment can be added to the configuration of another embodiment. In addition, a part of the configuration of each embodiment can be deleted or can be added with or replaced with another configuration.

REFERENCE SIGNS LIST 1, 1A surface inspection device
2 data acquisition unit
3 deformation amount computation unit (computation unit)
4 surface data determination unit (computation unit)
5 tendency data determination unit (computation unit)
6 shape correction unit
7 shape correction device
10 display device
11 storage device
101 inspection target
102 predetermined point of inspection target
103 predetermined surface including predetermined point of inspection target
201 point measurement sensor (point measurement unit)
202 surface measurement sensor (surface measurement unit)
203 robot
204 inspection stage
205 conveyance mechanism
301 reference shape
302 normal vector at predetermined point of inspection target
303 displacement vector at predetermined point of inspection target
304 vector obtained by projecting displacement vector at predetermined point of inspection target in normal direction of predetermined surface
305 vector obtained by projecting displacement vector at predetermined point of inspection target on predetermined surface
306 surface measurement data of inspection target
601 servomotor
602 cylinder
603 movable die
604 fixed die

The invention claimed is:

1. A shape correction device comprising:
a point measurement sensor that measures each of positions of predetermined points set on a surface of an inspection target;
a surface measurement sensor that measures a shape of a predetermined surface including the plurality of predetermined points by simultaneously measuring positions of a plurality of points of the inspection target, wherein the surface measurement sensor is arranged in parallel with the point measurement sensor at a distal end of a robotic arm of the shape correction device;
a computer that acquires data from the point measurement sensor and the surface measurement sensor and obtains an amount of deformation of the inspection target from a reference shape based on a displacement vector based on the positions of the predetermined points measured by the point measurement sensor and a normal direction of the predetermined surface measured by the surface measurement sensor; and a shape correction unit comprising a servomotor, a movable die, and a fixed die, the movable die and the fixed die being arranged as to permit the inspection target to be located between the movable die and the fixed die, and the servomotor being configured to drive the movable die to press on the inspection target, and wherein the shape correction unit acquires data from the computer and corrects deformation of the inspection target based on the amount of deformation obtained by the computer.

2. The shape correction device according to claim 1, wherein the computer obtains, as the amount of deformation, a magnitude of a vector obtained by projecting the displacement vector from the reference shape of the inspection target in the normal direction of the predetermined surface, and wherein the shape correction unit corrects the deformation of the inspection target based on the magnitude of the vector.

3. The shape correction device according to claim 1, wherein the computer obtains, as the amount of deformation, a magnitude of a vector obtained by projecting the displacement vector from the reference shape of the inspection target on the predetermined surface, and wherein the shape correction unit corrects the deformation of the inspection target based on the magnitude of the vector.

4. The shape correction device according to claim 1, wherein the computer analyzes a change tendency by analyzing a time-series change in amount of deformation, and determines whether or not there is an abnormality in the change tendency of the amount of deformation, and wherein the shape correction unit corrects the deformation of the inspection target upon a determination by the computer that the change tendency of the amount of deformation is abnormal.

5. The shape correction device according to claim 1, wherein the point measurement sensor is a contact-type sensor that comes into contact with the inspection target, the surface measurement sensor is a non-contact-type sensor that measures the shape without coming into contact with the inspection target, and the shape correction unit is positioned such that the movable die is located above the inspection target and the servomotor drives a cylinder to press the movable die down such that the movable die contacts the inspection target.

6. The shape correction device according to claim 1, wherein the measurement performed by the point measurement sensor and the measurement performed by the surface measurement sensor are performed simultaneously, and wherein the correction performed by the shape correction unit is performed after both the measurement of the point measurement sensor and the measurement of the surface measurement sensor are performed.

7. The shape correction device according to claim 1, wherein the computer determines whether or not there is an abnormality in a shape of the inspection target based on the amount of deformation, and the shape correction unit corrects the deformation of the inspection target upon a determination by the computer that the shape of the inspection target is abnormal.

8. A shape correction method comprising:

a point measurement step of measuring each of positions of predetermined points set on a surface of an inspection target;

a surface measurement step of performing surface measurement of a shape of a predetermined surface including the plurality of predetermined points by simultaneously measuring positions of a plurality of points of the inspection target;

a computation step of obtaining an amount of deformation of the inspection target from a reference shape based on a displacement vector based on the positions of the predetermined points measured in the point measurement step and a normal direction of the predetermined surface measured in the surface measurement step; and a shape correction step of correcting deformation of the inspection target based on the amount of deformation obtained in the computation step.

9. The shape correction method according to claim 8, wherein a magnitude of a vector obtained by projecting the displacement vector from the reference shape of the inspection target in the normal direction of the predetermined surface is obtained as the amount of deformation, and wherein the shape correction step corrects the deformation of the inspection target based on the magnitude of the vector.

10. The shape correction method according to claim 8, wherein a magnitude of a vector obtained by projecting the displacement vector from the reference shape of the inspection target on the predetermined surface is obtained as the amount of deformation, and wherein the shape correction step corrects the deformation of the inspection target based on the magnitude of the vector.

11. The shape correction method according to claim 8, further comprising a tendency determination step of analyzing a change tendency by analyzing a time-series change in amount of deformation of the inspection target from the reference shape, and determining whether or not there is an abnormality in the change tendency of the amount of deformation, and wherein the shape correction step corrects the deformation of the inspection target upon a determination by the computer that the change tendency of the amount of deformation is abnormal.

12. The shape correction method according to claim 8, wherein in the point measurement step, the position of the predetermined point is measured by coming into contact with the inspection target, in the surface measurement step, the shape is measured without coming into contact with the inspection target, and in the shape correction step, the shape is corrected by a servomotor driving a cylinder to press a movable die such that the movable die contacts the inspection target.

13. The shape correction method according to claim 8, wherein the measurement in the point measurement step and the measurement in the surface measurement step are simultaneously performed, and wherein the shape correction step is performed after both the point measurement step and the surface measurement step are performed.

14. The shape correction method according to claim 8, wherein in the computation step, whether or not there is an abnormality in a shape of the inspection target is determined based on the amount of deformation, and wherein the shape correction step corrects the shape of the inspection target upon a determination in the computation step that the shape of the inspection target is abnormal.

* * * * *